United States Patent Office 2,830,906
Patented Apr. 15, 1958

2,830,906
YEAST PLASTICIZER

John E. Farbak, Chicago, Ill., and Edward J. Kasmen, Denver, Colo., assignors to Swift & Company, Chicago, Ill., a corporation of Illinois No Drawing. Application August 3, 1955
Serial No. 526,323

12 Claims. (Cl. 99—96)

This invention in general relates to plasticizing compositions. More specifically, the invention relates to compositions which serve as plasticizing and whitening agents for yeast and to the yeast product containing said agents.

The plasticizers of this invention are added to yeast to prevent crumbling during cutting and wrapping operations in the manufacture of yeast and during handling and shipping of the finished product, to afford lubrication during extrusion of yeast in its manufacture, and to improve the color of finished yeast. The composition additionally imparts water retention properties to the finished yeast. The mixed ingredients form a clear, homogeneous liquid, and the constituents remain in solution at temperatures approaching 32° F.

These plasticizing compositions comprise, as the major ingredient, an edible vegetable triglyceride oil which is liquid at room temperature and, as minor ingredients, a combination of surface active fatty compositions which have a synergistic whitening effect on the yeast. We prefer propane refined soybean or cottonseed oil, alkali refined and bleached soybean oil, or cottonseed salad oil, and mixtures thereof, as the major ingredient. The minor ingredients are anionic and non-ionic surface active compositions. The anionic composition is an alkali metal salt of a sulfated triglyceride fatty oil which is fluid at temperatures of about 50° F. and above, such as the alkali metal salts of sulfated soybean oil and sulfated cottonseed salad oil. One of the non-ionic compositions is oleic acid partial glycerides. A small amount of second non-ionic compound is included in the plasticizing composition to further improve whitening and water retention properties. This second non-ionic composition may be fatty acid esters of sorbitans or fatty acid monoesters of polyoxyethylene glycol such as mono-oleate ester or a monostearate ester of polyoxyethylene glycol.

The compositions of this invention preferably are formulated in the following approximate proportions by weight: propane refined soybean oil, propane refined cottonseed oil, alkali refined and bleached soybean oil, or cottonseed salad oil, 55–75 parts; alkali metal salt of sulfated soybean oil, or sulfated cottonseed oil, 20–40 parts; oleic acid partial glycerides, 2–15 parts; and sorbitan-fatty acid esters or fatty acid mono-esters of polyoxyethylene glycol, 1–2 parts.

Propane refined soybean oil is a degummed oil in which the gums are removed by separation of the gums as the bottoms fraction by fractionation in liquefied propane at a ratio of 15–35 parts propane to one part oil and a temperature between 150 and 180° F. at a pressure from 520–600 p. s. i. g. Cottonseed salad oil is a low melting fraction of cottonseed oil which has been alkali refined, deodorized, bleached, and winterized. Propane refined cottonseed oil is a degummed oil which has been destearinized and decolorized in liquefied propane under the aforementioned conditions. The purpose for refining the edible triglyceride oils is to produce a degummed, substantially colorless and odorless oil which is liquid at room temperature. Obviously, other refining techniques may be used to achieve a refined oil having these properties.

The oleic acid partial glycerides used in the instant invention are mixtures of oleic acid monoglycerides, diglycerides and triglycerides. These compositions contain approximately 40 to 60% monoglycerides, 30 to 50% diglycerides and 10 to 20% triglycerides. The commercial oleic acid monoglyceride mixtures contain small amounts of esterified palmitic and stearic acids. Fatty acid esters of sorbitan which have been found to be effective are sorbitan monolaurate, sorbitan monopalmitate, sorbitan monostearate and sorbitan mono-oleate. A mixture of sorbitan monolaurate and glyceryl monolaurate is especially effective for water retention.

The following examples are provided to show embodiments of the compositons of this invention and hence should not be construed as placing any limitation on the invention defined by the appended claims.

Example I

| | Percent |
|---|---|
| Propane refined soybean oil | 68 |
| Polyoxyethylene monostearate (avg. mol. wt. 540) | 1 |
| Oleic acid partial glycerides | 3 |
| Sodium salt of sulfated degummed soybean oil | 28 |
| | 100 |

Example II

| | Percent |
|---|---|
| Propane refined soybean oil | 65.0 |
| Sorbitan mono-oleate | 1.5 |
| Oleic acid partial glycerides | 7.5 |
| Sodium salt of sulfated cottonseed salad oil | 26.0 |
| | 100.0 |

Example III

| | Percent |
|---|---|
| Alkali refined and bleached soybean oil | 68.0 |
| Polyoxyethylene mono-oleate | 1.5 |
| Oleic acid partial glycerides | 3.5 |
| Sodium salt of sulfated cottonseed salad oil | 27.0 |
| | 100.0 |

Example IV

| | Percent |
|---|---|
| Propane refined soybean oil | 67.3 |
| Sorbitan monostearate | 1.1 |
| Oleic acid partial glycerides | 3.6 |
| Sodium salt of sulfated degummed soybean oil | 28.0 |
| | 100.0 |

Example V

| | Percent |
|---|---|
| Propane refined soybean oil | 68 |
| Glyceryl monolaurate-sorbitan monolaurate mixture | 1 |
| Oleic acid partial glycerides | 3 |
| Sodium salt of sulfated degummed soybean oil | 28 |
| | 100 |

The compositions of this invention are incorporated into the yeast after the filtration step of the yeast manufacturing process. In the conventional procedure for yeast processing, the plasticizing composition is weighed and mixed well with the filtered yeast and water. The yeast is then extruded and packaged. Because the constituents of plasticizing composition do not drop out or separate from the yeast at temperatures around 50° F., crushed ice may be added instead of water to the yeast-plasticizer mixture for extrusion at a temperature approximately 10° F. lower than is normally employed. Extrusion of the yeast at the lower temperature reduces tempering time for the finished yeast by approximately one day. The plasticizer is added to the yeast in the range of one-half to one and one-half weight percent, generally about two-thirds of one percent.

Thus, the finished yeast contains from approximately one-half to one and one-half percent of the plasticizer of this invention. It is white in appearance, and the yeast cakes have a smooth uniform surface, unmarred by crumbling.

Obviously, many modifications and variations of the invention as hereinbefore set forth may be made without departing from the spirit and scope thereof, and therefore only such limitations should be imposed as are indicated in the appended claims.

We claim:

1. A composition of matter which comprises a mixture of a substantial odorless edible vegetable triglyceride oil which is liquid at room temperature in an amount exceeding 55% by weight of the composition; and, as minor ingredients, oleic acid partial glycerides, an alkali metal salt of a sulfated triglyceride fatty oil, and a fatty acid mono-ester of a polyhydric alcohol from the group consisting of sorbitan and polyoxyethylene glycol.

2. A composition of matter which comprises a mixture of a degummed edible vegetable triglyceride oil which is liquid at room temperature in an amount exceeding 55% by weight of the composition; and, as minor ingredients, oleic acid partial glycerides, an alkali metal salt of a sulfated triglyceride fatty oil, and a non-ionic emulsifier selected from the group consisting of fatty acid esters of polyoxyethylene glycol and fatty acid esters of sorbitan.

3. A composition of matter which comprises in the following parts by weight a mixture of an edible vegetable triglyceride oil which is liquid at room temperature, 55–75 parts; an alkali metal salt of a sulfated triglyceride oil, 20–40 parts; oleic acid partial glycerides, 2–15 parts; and a non-ionic emulsifier from the group consisting of polyoxyethylene mono-oleate, polyoxyethylene monostearate, sorbitan monolaurate, sorbitan monostearate, sorbitan mono-oleate, sorbitan monostearate, sorbitan monopalmitate, and a mixture of sorbitan monolaurate and glyceryl monolaurate, 1–2 parts.

4. A composition of matter which comprises in the following parts by weight a mixture of an edible vegetable triglyceride oil selected from the group consisting of degummed soybean oil and degummed cottonseed oil, 55–75 parts; an anionic emulsifier selected from the group consisting of an alkali metal salt of sulfated degummed soy bean oil and sulfated cottonseed salad oil, 20–30 parts; oleic acid partial glycerides, 2–15 parts; and a non-ionic surface active composition selected from the group consisting of fatty acid mono-esters of polyoxyethylene glycol and fatty acid mono-esters of sorbitan, 1–2 parts.

5. A composition of matter which comprises a mixture in the following approximate proportions by weight of: propane refined soybean oil, 68 parts; polyoxyethylene monostearate, 1 part; oleic acid partial glycerides, 3 parts; and the sodium salt of sulfated degummed soybean oil, 28 parts.

6. A composition of matter which comprises a mixture in the following approximate proportions by weight of: a substantial odorless edible vegetable triglyceride oil which is liquid at room temperature, 68 parts; a fatty acid mono-ester of polyoxyethylene glycol, said fatty acid from the group consisting of stearic acid and oleic acid, 1 part; oleic acid partial glycerides, 3 parts; and an alkali metal salt of a sulfated triglyceride oil which is liquid at temperatures of 50° F. and above, 28 parts.

7. A composition of matter which comprises yeast plasticized by a composition comprising a mixture of an edible vegetable triglyceride oil which is liquid at room temperature in an amount exceeding 55% by weight of the composition and, as minor ingredients, oleic acid partial glycerides, an alkali metal salt of a sulfated triglyceride fatty oil, and a fatty acid mono-ester of a polyhydric alcohol from the group consisting of sorbitan and polyoxyethylene glycol.

8. A composition of matter which comprises yeast plasticized by a composition comprising a mixture of a degummed edible vegetable triglyceride oil which is liquid at room temperature in an amount exceeding 55% by weight of the composition and, as minor ingredients, oleic acid partial glycerides, an alkali metal salt of a sulfated triglyceride fatty oil, and a non-ionic emulsifier selected from the group consisting of fatty acid esters of polyoxyethylene glycol and fatty acid esters of sorbitan.

9. A composition of matter which comprises yeast plasticized by a composition comprising in the following parts by weight a mixture of an edible vegetable triglyceride oil which is liquid at room temperature, 55–75 parts; an alkali metal salt of a sulfated triglyceride oil, 20–40 parts; oleic acid partial glycerides, 2–15 parts; and a non-ionic emulsifier from the group consisting of polyoxyethylene mono-oleate, polyoxyethylene monostearate, sorbitan monolaurate, sorbitan monostearate, sorbitan mono-oleate, sorbitan monostearate, sorbitan monopalmitate, and a mixture of sorbitan monolaurate and glyceryl monolaurate, 1–2 parts.

10. A composition of matter which comprises yeast plasticized by a composition comprising in the following parts by weight a mixture of an edible vegetable triglyceride oil selected from the group consisting of degummed soybean oil and degummed cottonseed oil 55–75 parts; an anionic emulsifier selected from the group consisting of an alkali metal salt of sulfated degummed soybean oil and sulfated cottonseed salad oil, 20–30 parts; oleic acid partial glycerides, 2–15 parts; and a non-ionic surface active composition selected from the group consisting of fatty acid mono-esters of polyoxyethylene glycol and fatty acid mono-esters of sorbitan, 1–2 parts.

11. A composition of matter which comprises yeast plasticized by a composition comprising a mixture in the following approximate proportions by weight, propane refined soybean oil, 68 parts; polyoxyethylene monostearate, 1 part; oleic acid partial glycerides, 3 parts; and an alkali metal salt of sulfated degummed soybean oil, 28 parts.

12. A composition of matter which comprises yeast plasticized by a composition comprising a mixture in the following approximate proportions by weight of: an edible vegetable triglyceride oil which is liquid at room temperature, 68 parts; a fatty acid mono-ester of polyoxyethylene glycol, said fatty acid from the group consisting of stearic acid and oleic acid, 1 part; oleic acid partial glycerides, 3 parts; and an alkali metal salt of sulfated triglyceride oil which is liquid at temperatures of 50° F. and above, 28 parts.

References Cited in the file of this patent

UNITED STATES PATENTS

| | | |
|---|---|---|
| 2,136,399 | Schultz et al. | Nov. 15, 1938 |
| 2,223,464 | Schultz et al. | Dec. 3, 1940 |

U. S. DEPARTMENT OF COMMERCE
PATENT OFFICE

CERTIFICATE OF CORRECTION

Patent No. 2,830,906     John E. Farbak et al.     April 15, 1958

It is hereby certified that error appears in the printed specification of the above numbered patent requiring correction and that the said Letters Patent should read as corrected below.

Column 3, lines 17 and 64, for "substantial", in each occurrence, read -- substantially --.

Signed and sealed this 10th day of June 1958.

(SEAL)
Attest:

KARL H. AXLINE
Attesting Officer

ROBERT C. WATSC
Commissioner of Paten